(No Model.)
F. A. POLKA.
DRAFT EQUALIZER.
No. 477,064. Patented June 14, 1892.
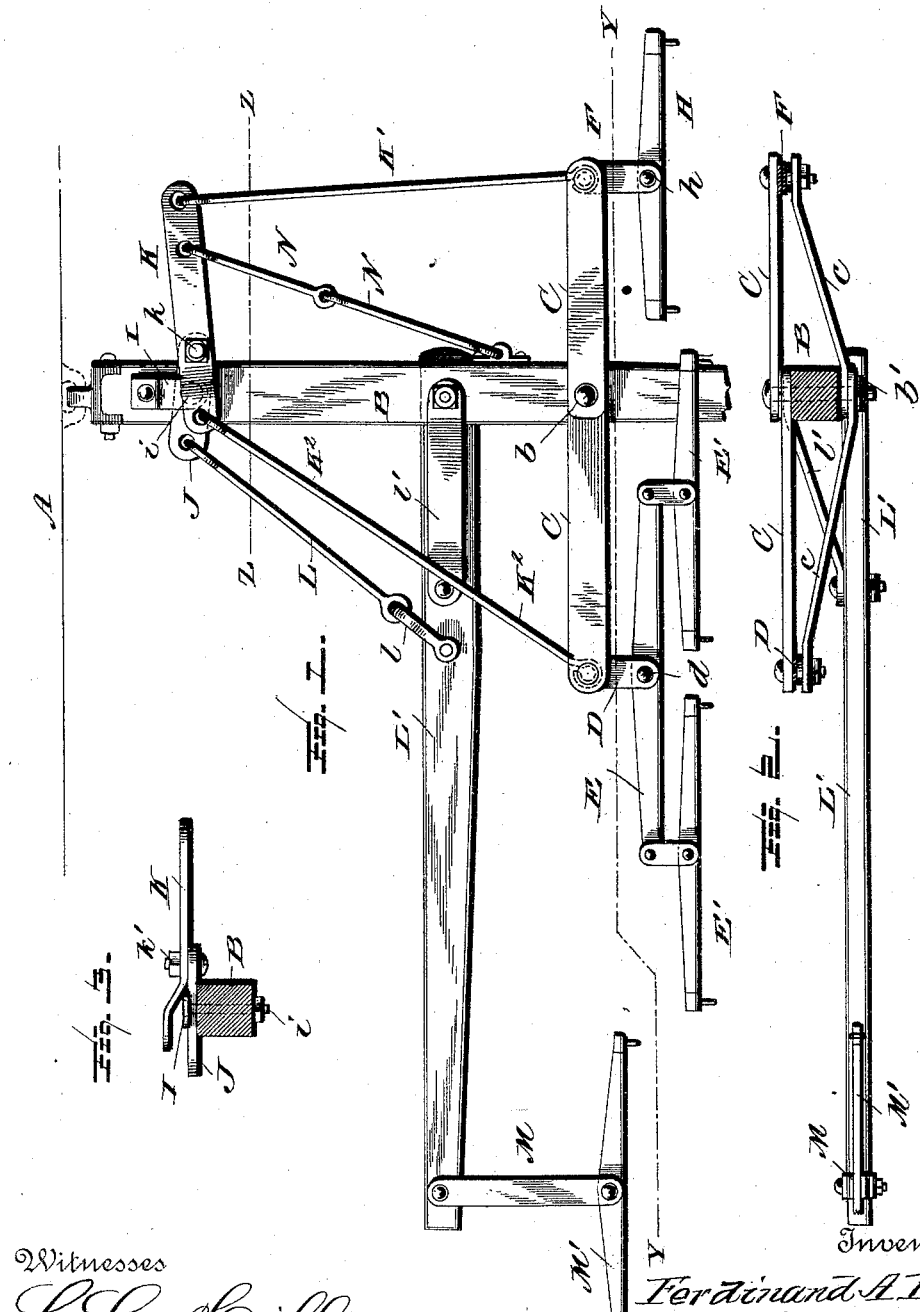
Witnesses
L. C. Hills
Wm Goddard
Inventor
Ferdinand A. Polka
per Chas. H. Fowler
Attorney

UNITED STATES PATENT OFFICE.

FERDINAND A. POLKA, OF OAKES, NORTH DAKOTA.

DRAFT-EQUALIZER.

SPECIFICATION forming part of Letters Patent No. 477,064, dated June 14, 1892.

Application filed March 16, 1892. Serial No. 425,092. (No model.)

*To all whom it may concern:*

Be it known that I, FERDINAND A. POLKA, a citizen of the United States, residing at Oakes, in the county of Dickey and State of North Dakota, have invented certain new and useful Improvements in Draft-Equalizers; and I do hereby declare that the following is a full, clear, and exact description of the same, reference being had to the annexed drawings, making a part of this specification, and to the letters of reference marked thereon.

This invention relates to certain new and useful improvements in draft-equalizers; and it has for its objects, among others, to provide an improved device of this character whereby simplicity, durability, cheapness, and efficiency are combined and in which provision is made for a four-horse evener, with three horses drawing from the inside of the machine and one from the outside, which has the tendency to take off more of the side draft than where there are two horses on each side of the pole. By a slight change of the parts I can provide a most efficient three-horse evener.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, in which—

Figure 1 is a top plan of my improved four-horse evener. Fig. 2 is a vertical cross-section on the line $y\ y$ of Fig. 1. Fig. 3 is a vertical cross-section on the line $z\ z$ of Fig. 1.

Like letters of reference indicate like parts throughout the several views in which they appear.

Referring now to the details of the drawings by letter, A designates the front part of the machine—say, of a harvester—and B the pole connected therewith in any suitable manner. Toward the front end of the pole there is secured thereto by a pivot-bolt $b$ the lateral bars C, the said bars being braced by the inclined braces $c$, which extend from the outer ends thereof under the pole, where they are secured on the bolt $b$ by a nut $b'$, as seen in Fig. 2. To the right-hand end of the top bar and between the same and its brace is held the forwardly-extending short arm D, to the forward end of which is pivotally secured, as by a pivot $d$, the doubletree E, carrying the singletrees E' E', as seen in Fig. 1. To the other end of the bars C, and between the same and its brace, is secured the forwardly-extending short arm F, to which is pivotally held, as by a pivot $h$, the singletree H, as seen in Fig. 1.

To the rear end of the pole or tongue there is secured upon the upper face a plate I, beneath which is pivoted on a pivot $i$ the equalizing-lever J, to the left-hand end of which is pivoted, as on a pivot $k$, the equalizing-lever K, the outer end of which is connected by a rod K' with the left-hand end of the bar C in any suitable manner. The other end of this lever K is pivotally connected by a rod $K^2$ with the outer end of the other bar C, as seen in Fig. 1. To the other end of the lever J is pivotally connected one end of the rod L, the other end of which is connected with a hook or link or analogous device $l$, pivotally held on the equalizing-lever L', as seen in Fig. 1. This lever L' is pivoted to the pole or tongue between its rear end and the bars C, and is suitably braced and strengthened by the brace-arm $l'$, as shown in Figs. 1 and 2. To the outer end of this lever L' is pivotally held a forwardly-extending arm M, to which is pivoted the singletree M', as seen in Figs. 1 and 2.

N are links, or it may be a cord or chain, connected with the lever K near its outer end and with the pole at any suitable point, as near the pivot of the lever L', and serves to keep the near horse from allowing his singletree to come in contact with the reel of the harvester on turning corners.

The operation will be readily understood from the foregoing description, when taken in connection with the annexed drawings, and a detailed description thereof is not deemed necessary.

By simply removing the equalizing-lever L' and the lever J and pivoting the lever K on the pivot $i$ I provide an excellent three-horse evener. For this purpose the pivots of the levers are held in place by nuts, as shown, so that they may be readily removed, when desired.

Modifications in detail may be resorted to without departing from the spirit of the invention or sacrificing any of its advantages.

What I claim as new is—

1. The combination, with the pole and the front cross-bars, of the equalizing-lever pivoted to the rear of the pole on a removable pivot, the equalizing-lever pivoted to one end thereof, the removably-pivoted central equalizing-lever, and the rods connecting the two rear levers with the central lever and with the front cross-bars, substantially as specified.

2. The combination, with the pole and the front cross-bars, of the equalizing-lever K, pivoted to the rear end of the pole, the rod pivotally connecting one end thereof with the cross-bars, and the chain connecting the said lever with the pole, and the central equalizing-lever pivoted on the pole between the cross-bars and rear levers and connected by rod to a lever connected with the said lever K, as and for the purpose specified.

In testimony that I claim the above I have hereunto subscribed my name in the presence of two witnesses.

FERDINAND A. POLKA.

Witnesses:
E. W. WESTON,
WM. H. ELLIS.